No. 633,523.
A. J. LYTLE.
HORSE HOOF PLANER.
(Application filed Sept. 7, 1897.)
(Model.)
Patented Sept. 19, 1899.
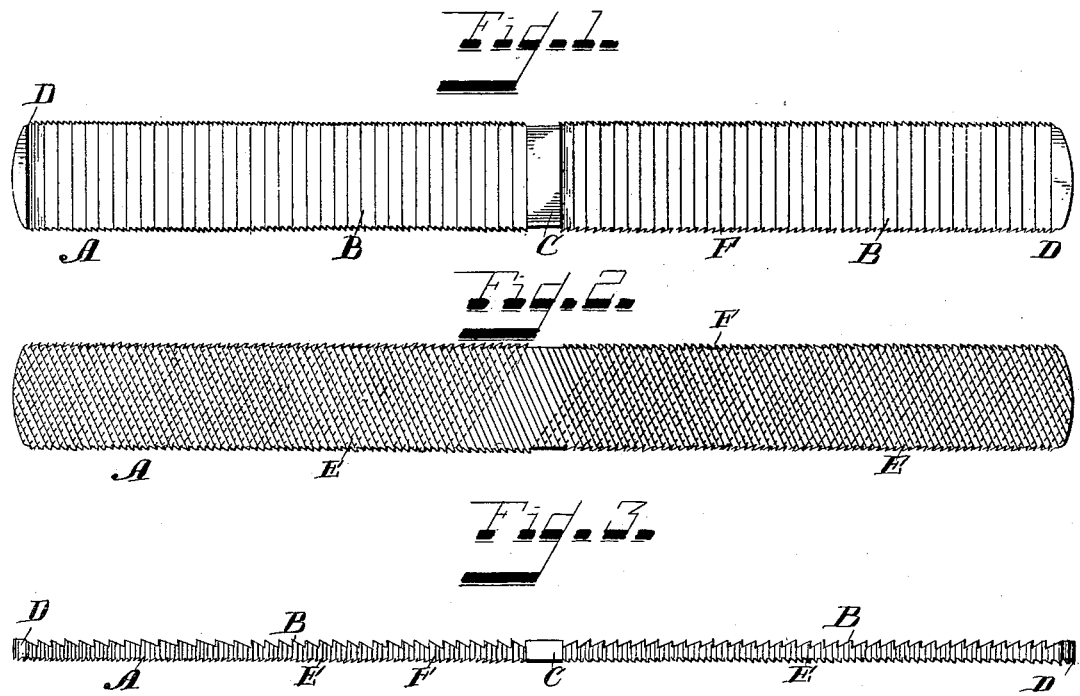
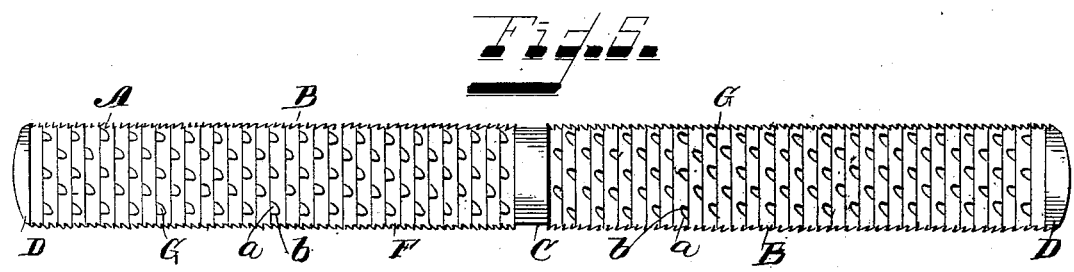
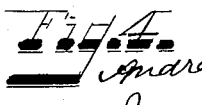
Witnesses
Bernard J. Hausfeld.
George H. Ricks.
Inventor
Andrew J. Lytle
per Jacob Felbel
Attorney
THE NORRIS PETERS CO., PHOTO-LITHO., WASHINGTON, D. C.

United States Patent Office.

ANDREW J. LYTLE, OF WASHINGTON COURT-HOUSE, OHIO.

HORSE-HOOF PLANER.

SPECIFICATION forming part of Letters Patent No. 633,523, dated September 19, 1899.

Application filed September 7, 1897. Serial No. 650,886. (Model.)

*To all whom it may concern:*

Be it known that I, ANDREW J. LYTLE, a citizen of the United States, residing at Washington Court-House, in Fayette county and State of Ohio, have invented certain new and useful Improvements in Horse-Hoof Planers, of which the following is a specification.

This invention relates to metal tools and implements, and more especially to files and rasps; and the object of same is to produce an improved horse-hoof planer.

To this end the invention consists in a planer of this character having its teeth constructed as hereinafter set forth, all as shown in the accompanying drawings, in which—

Figure 1 is a plan view of the obverse of this rasp before the slits are cut. Fig. 2 is a view of the reverse. Fig. 3 is an edge view. Fig. 4 is an enlarged detail showing the grooved throats between the teeth. Fig. 5 is a plan view of the finished tool, showing both the main teeth and auxiliary teeth or slits.

Referring to the said drawings, the letter A designates as a whole my improved horse-hoof planer, having on one face the main teeth B, at its center a clear space C, from which the main teeth B face outwardly and toward both ends, and at the latter two clear spaces D, all the clear spaces being for the operator's hands while using this tool.

E designates ordinary teeth on the back of the rasp, and F ordinary teeth on its edges, both being for finishing purposes.

In all cases each main tooth B is composed of a vertical front face, an oblique rear face meeting front face in the cutting edge, which extends transversely entirely across bar A, and a curved or rounded throat $d$ between the front face of one tooth and rear face of the next tooth in advance. This grooved throat causes the planings that are cut by the edges of the teeth to pass down their front walls through the grooved throats and be thrown out by the walls of the teeth next in front. Hence this specific construction of the throats of the teeth causes the tool to be self-clearing.

In the finished tool, as shown in Fig. 5, the same main teeth B are used, and in addition thereto oblique slits G are cut at considerable intervals across the bodies of these teeth, though not extending down into the throats thereof. Their formation across the upright faces and the oblique rear walls of the main teeth produces at each intersection a cutting edge $a$, extending oblique to the length of the tool, and an additional cutting edge $b$, extending obliquely down the rear wall of each tooth. As the slits do not extend down into the throats $d$, it will be clear that the latter have the self-clearing properties above set forth; but in addition thereto the auxiliary cutting edges provide a means for more finely finishing the hoof being treated. These slits are each composed of one vertical wall, one inclined wall, and a curved throat, the same as above described with respect to the main teeth, and hence are also self-clearing.

It is essential in the manufacture of this tool that the grooves forming the various teeth be cut completely across the body of the bar, because said cutting can be done much more cheaply than if such teeth were formed in any other way. The clear spaces C and D may or may not be used in connection with the auxiliary teeth, as desired.

The exact size and proportions of parts are immaterial.

I refrain from giving the specific uses of the tool, as the same are well known to all persons who have of necessity to plane horses' hoofs for any purpose whatever.

What is claimed as new is—

1. A horse-hoof planer consisting of a bar having main teeth each comprising a substantially vertical front wall and an oblique rear wall, said walls meeting in a curved throat; and auxiliary teeth each consisting of two walls standing oblique to the length of the bar and extending part way down the walls of the main teeth but not to the bottom of the grooves between them, and also meeting in a curved throat.

2. A horse-hoof planer consisting of a bar having grooves extending entirely across it to form transverse teeth, the bottom of each groove being rounded or curved from the rear wall of one tooth into the front wall of the next, said teeth being interrupted at considerable intervals by spaced slits cut obliquely across the bar in the bodies of the teeth to form auxiliary cutting edges.

3. A horse-hoof planer consisting of a bar having grooves in its face to form the main teeth, the bottom of each groove being rounded or curved from the rear wall of one tooth into the front wall of the next, and slits cut obliquely across the bodies of the teeth but not to the bottom of the grooves, to form auxiliary teeth.

ANDREW J. LYTLE.

Witnesses:
ALBERT PADDACK,
F. D. FRANCIS.